(12) United States Patent
Tokuchi et al.

(10) Patent No.: US 7,907,494 B2
(45) Date of Patent: Mar. 15, 2011

(54) HOLOGRAM INFORMATION RECORDING MEDIUM AND HOLOGRAM INFORMATION RECORDING/REPRODUCING DEVICE

(75) Inventors: Naoyuki Tokuchi, Miyagi-ken (JP);
Yoshihiro Someno, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 730 days.

(21) Appl. No.: 11/816,092

(22) PCT Filed: Feb. 15, 2006

(86) PCT No.: PCT/JP2006/302649
§ 371 (c)(1),
(2), (4) Date: Aug. 10, 2007

(87) PCT Pub. No.: WO2006/092956
PCT Pub. Date: Sep. 8, 2006

(65) Prior Publication Data
US 2009/0052300 A1    Feb. 26, 2009

(30) Foreign Application Priority Data
Feb. 28, 2005    (JP) .................................. 2005-052375

(51) Int. Cl.
*G11B 7/24* (2006.01)
(52) U.S. Cl. ............................................. 369/103
(58) Field of Classification Search .................. 369/103, 369/275.1; 359/3
See application file for complete search history.

(56) References Cited

U.S. PATENT DOCUMENTS

| | | | |
|---|---|---|---|
| 6,490,061 B1 | 12/2002 | Tanaka et al. | |
| 6,958,967 B2 | 10/2005 | Kasazumi et al. | |
| 2002/0075776 A1* | 6/2002 | Kasazumi et al. | 369/47.5 |
| 2007/0127100 A1* | 6/2007 | Wilson et al. | 359/22 |
| 2007/0258343 A1* | 11/2007 | Jung et al. | 369/103 |

FOREIGN PATENT DOCUMENTS

JP    62-217283    9/1987

OTHER PUBLICATIONS

European Search Report dated Jun. 20, 2008 from European Application No. 06713790.1.

* cited by examiner

*Primary Examiner* — Thang V Tran
*Assistant Examiner* — Linh T Nguyen
(74) *Attorney, Agent, or Firm* — Beyer Law Group LLP (57) ABSTRACT

To provide a hologram information recording medium and a hologram information recording/reproducing device capable of accurately reproducing data multiplexed on the recording medium irrespective of the influence of the external environment and so forth.

In one recording area 31 of a recording medium 3, a plurality of the same information groups are recorded in substantially the same area with varied multi-parameters, in consideration of the expansion and the contraction of the recording medium 3. That is, a plurality of data groups A to D are recorded in the one recording area 31 of the recording medium 3, with a laser wavelength λ varied. Specifically, the data groups A to D are recorded in one recording area as three groups: a data group $G_1$ including data $A_1$, data $B_1$, data $C_1$, and data $D_1$; a data group $G_2$ including data $A_2$, data $B_2$, data $C_2$, and data $D_2$; and a data group $G_3$ including data $A_3$, data $B_3$, data $C_3$, and data $D_3$.

14 Claims, 3 Drawing Sheets

HOLOGRAM INFORMATION RECORDING MEDIUM AND HOLOGRAM INFORMATION RECORDING/REPRODUCING DEVICE

TECHNICAL FIELD

The present invention relates to a hologram information recording medium and a hologram information recording/reproducing device for recording/reproducing hologram information with respect to the recording medium with signal light and reference light interfered with each other.

BACKGROUND ART

Currently, an optical recording medium, such as a CD (Compact Disc) or a DVD (Digital Versatile Disc), has been widely used as a medium for recording a large amount of data. In recent years, there have been a demand for recording a high-definition moving image and a demand for recording a larger amount of data along with the development of the personal computer. The optical recording medium, such as the CD or the DVD, cannot be sufficiently increased in density to allow such a large amount of data to be recorded thereon. Thus, the large amount of data cannot be recorded on a single disc. To record the large amount of data, therefore, it is necessary to record the data while replacing a plurality of discs. In recent years, attention has been drawn to a hologram recording medium which can record thereon a substantially larger amount of data than the existing CD and DVD.

As hologram information recording, there is a method of dividing beam light into two mutually coherent lights, performing data modulation on one of the lights in a spatial light modulator to form signal light, and combining, on a recording medium, the signal light with the other light which acts as reference light, to thereby record data as interference fringes. The recording medium is then irradiated with the same reference light as the reference light used in the recording so that the signal light can be detected as reproduction light. Thereby, the data can be reproduced. In the hologram information recording/reproducing, the signal light is not reproduced if the wavelength or the irradiation angle of the light used in the information reproduction is different from the wavelength or the irradiation angle of the light used in the information recording. With the use of the above characteristic, a recording has been performed in which the wavelength or the irradiation angle of the light used in the information recording/reproducing is changed to perform multiplex recording of data in the same area of the recording medium.
Patent Document 1: Japanese Unexamined Patent Application Publication No. 2002-216359

DISCLOSURE OF THE INVENTION

Problem to be Solved by the Invention

However, an information recording medium is usually formed of a synthetic resin. Thus, if the external environment, particularly the temperature, is changed, the information recording medium expands or contracts. In the reproduction of the data multiplexed on the information recording medium with varied wavelengths or irradiation angles of the light, the respective wavelengths or irradiation angles are associated with the data. Thus, if the information recording medium expands or contracts due to the change in temperature, as described above, the information reproduction is performed under a different condition from the condition of the information recording. Therefore, there is a problem in that the data multiplexed on the information recording medium cannot be reproduced.

The present invention has been made in light of the above issue. An object of the present invention is to provide a hologram information recording medium and a hologram information recording/reproducing device capable of accurately reproducing data multiplexed on the recording medium irrespective of the influence of the external environment and so forth.

Means to Solve the Problem

A hologram information recording medium according to the present invention is a hologram information recording medium for performing recording thereon by irradiating the recording medium with signal light and reference light while varying a multi-parameter, and for reproducing information therefrom by using reproduction light diffracted by the reference light while varying the above multi-parameter. The hologram information recording medium is characterized in that a plurality of hologram information groups including the same data are recorded by different multi-parameters in substantially the same area of the hologram information recording medium so as to allow the expansion and the contraction of the hologram information recording medium according to the temperature.

According to the above configuration, if the information recording medium expands or contracts due to an increase or a decrease in temperature, the exact information group recorded in the information recording cannot be read. However, another one of the information groups can be read. The information groups are the same. As a result, therefore, the information group can be accurately reproduced irrespective of the external temperature, and defective reproduction due to the influence of the external environment and so forth can be reliably prevented.

A hologram information recording/reproducing device according to the present invention includes a light source for emitting signal light and reference light, an optical system for irradiating an information recording medium with the signal light and the reference light, and multi-parameter control means for controlling a multi-parameter to perform multiplex recording of information on the information recording medium. The hologram information recording device is characterized in that the multi-parameter control means records hologram information groups including the same data, a plurality of times, with different multi-parameters in substantially the same area of the information recording medium so as to allow the expansion and the contraction of the information recording medium according to the temperature.

According to the above configuration, with the plurality of information groups recorded on the information recording medium, the information multiplexed on the information recording medium can be accurately reproduced irrespective of the influence of the external environment and so forth. Further, according to the above configuration, the plurality of the same information groups are recorded to cope with the expansion and the contraction of the information recording medium. Thus, there is no need for a substantial change in the dynamic range of laser light. Therefore, the reproduction can be performed with one laser. Accordingly, the hologram information reproducing device can be simply and inexpensively configured.

It is preferable that the hologram information recording/reproducing device according to the present invention includes temperature detection means for detecting the temperature in the vicinity of the information recording medium, and correction means for performing correction of the multi-parameter in information reproduction on the basis of the temperature detected by the temperature detection means.

According to the above configuration, the temperature in the vicinity of the information recording medium is measured to correct the relationship between the temperature and the multi-parameter. Therefore, the accurate wavelength for the information reproduction can be determined in a short time. As a result, wavelength control in the information reproduction can be promptly performed.

In the hologram information recording/reproducing device according to the present invention, it is preferable that the multi-parameter is the wavelength of the signal light or the reference light or the angle at which the recording medium is irradiated with the signal light or the reference light.

It is preferable that each of the hologram information groups includes index information which includes temperature condition data in the recording of the hologram information group, and that the multi-parameter control means controls the multi-parameter in the information reproduction on the basis of the index information.

A hologram information recording method according to the present invention is characterized by including a step of preparing an information recording medium, and a step of recording hologram information groups including the same data, a plurality of times, in substantially the same area of the above information recording medium while varying a multi-parameter of signal light and reference light so as to allow the expansion and the contraction of the recording medium according to the temperature.

ADVANTAGES OF THE INVENTION

In a hologram information recording medium according to the present invention, a multi-parameter is varied to record a plurality of the same information groups in substantially the same area. Accordingly, data multiplexed on the recording medium can be accurately reproduced irrespective of the influence of the external environment and so forth.

BEST MODE FOR CARRYING OUT THE INVENTION

With reference to the accompanying drawings, embodiments of the present invention will be described in detail below.

EMBODIMENT 1

Figure 1:
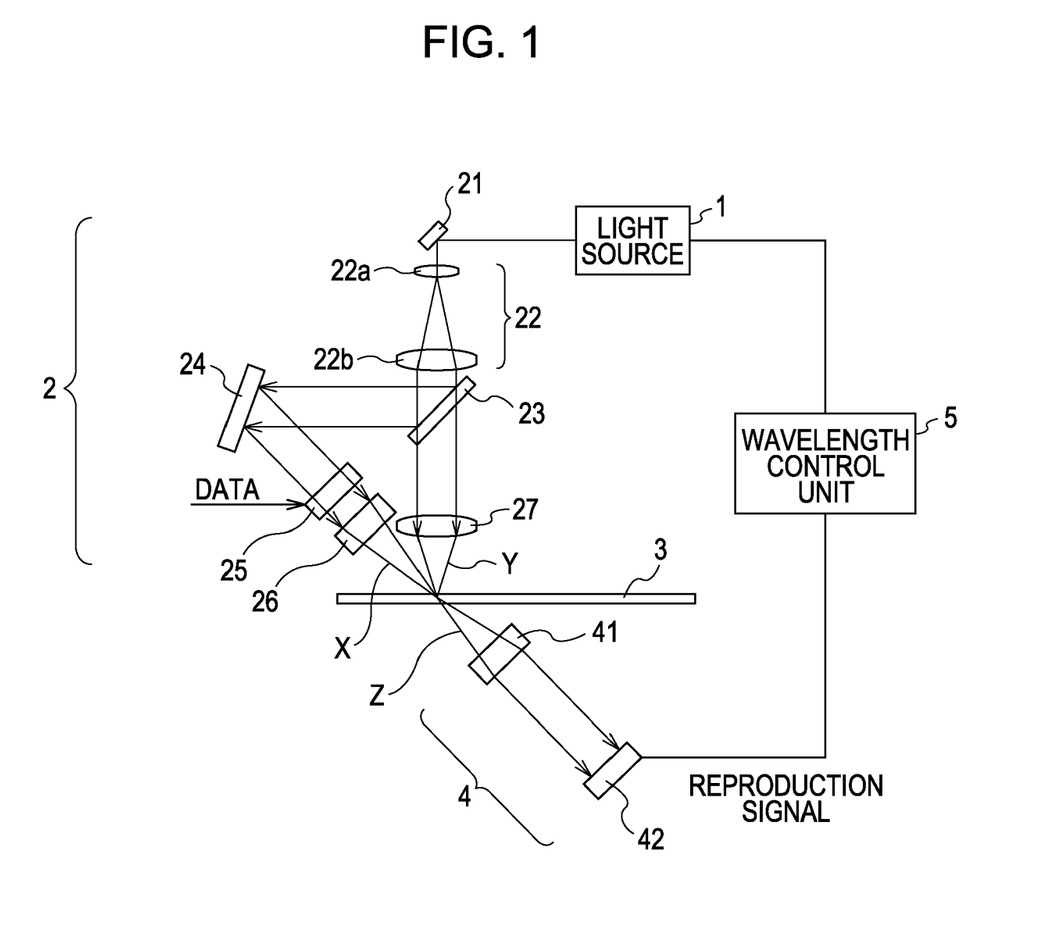
FIG. 1 is a diagram illustrating a schematic configuration of a hologram information recording/reproducing device according to Embodiment 1 of the present invention.

FIG. 1 is a diagram illustrating a schematic configuration of a hologram information recording/reproducing device according to Embodiment 1 of the present invention. The reference numeral 1 in the drawing denotes a light source which emits light for recording or reproducing information. At a subsequent stage of the light source 1 (a forward position on an optical path in the traveling direction of light), a first optical system 2 is disposed which divides the light emitted from the light source 1 into two coherent lights to irradiate a recording medium 3 located at a subsequent stage thereof. At a subsequent stage of the recording medium 3, a second optical system 4 is disposed which receives a reproduction signal. At a subsequent stage of the second optical system 4, a wavelength control unit 5 is disposed which serves as multi-parameter varying means for varying a multi-parameter in multiplex recording of information on the recording medium.

As the light source 1, a light source for emitting beam-like light, such as a light source for emitting laser light having a predetermined wavelength, can be used. For example, a semiconductor laser or the like can be used as the light source 1.

As illustrated in FIG. 1, the first optical system 2 includes a first mirror 21 for changing the optical path of the beam light emitted from the light source 1, a beam expander 22 for increasing the beam diameter of the beam light, a beam splitter 23 for dividing the beam light into two mutually coherent lights, a second mirror 24 for changing the optical path of one of the divided lights, a spatial light modulator 25 for performing data modulation on the light having the optical path changed by the second mirror 24, a Fourier transform lens 26 for condensing the data-modulated signal light on the recording medium 3, and a condenser lens 27 for condensing on the recording medium 3 the other one of the lights divided by the beam splitter 23. The beam expander 22 includes a first lens 22a for diffusing the beam light having the optical path changed by the first mirror 21, and a second lens 22b for converting the diffused light into parallel light. The spatial light modulator 25 can be formed by a two-dimensional array space digital filter (a transmission filter) or the like, for example. Therefore, the signal light data-modulated in the spatial light modulator 25 includes a two-dimensional pattern.

Figure 2:
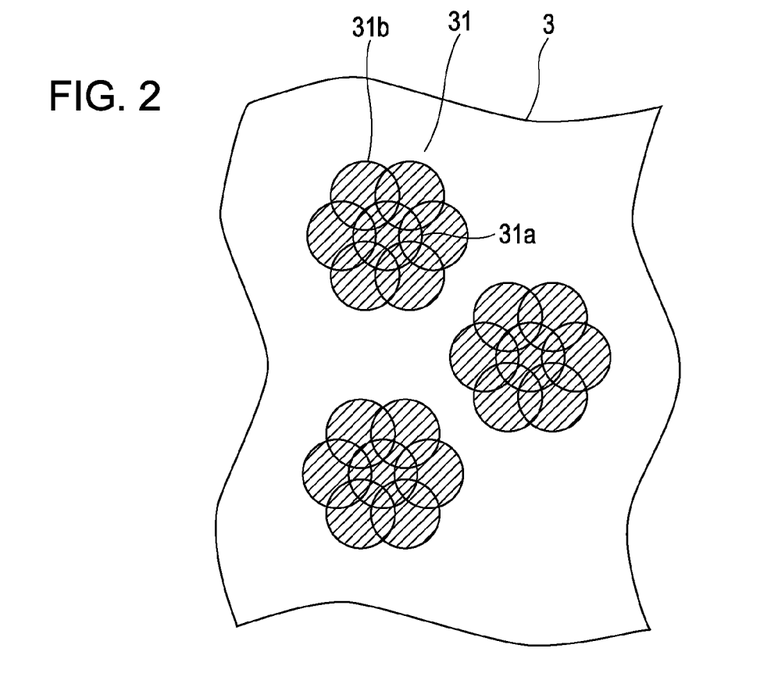
FIG. 2 is a diagram illustrating a recording area on a recording medium.

As illustrated in FIG. 2, the recording medium 3 includes a recording area 31, in which data is multiplexed. That is, each data element is associated with a multi-parameter value, and a plurality of data elements 31a and 31b are multiplexed in substantially the same area with varied multi-parameters. If a multi-parameter value is identified, therefore, a data element associated with the multi-parameter value can be read. In this manner, different data elements can be recorded in substantially the same area. Therefore, a large volume of data can be recorded on the recording medium 3. In multiplexing the data elements in the recording area 31, the data elements may be overlapped in the same area, or may be overlapped in a slightly displaced state. With the recording efficiency taken into account, it is desirable to record the data elements so as to be overlapped in the same area as much as possible.

As the recording medium 3, a recording medium for a hologram memory is used. For example, as the material of a hologram recording medium for fixed recording, a silver salt photosensitive material, dichromated gelatin, photopolymer, and so forth can be used. As the material of a hologram recording medium for rewriting, a photoinduced refractive material, thermoplastic, and so forth can be used.

Figure 3:
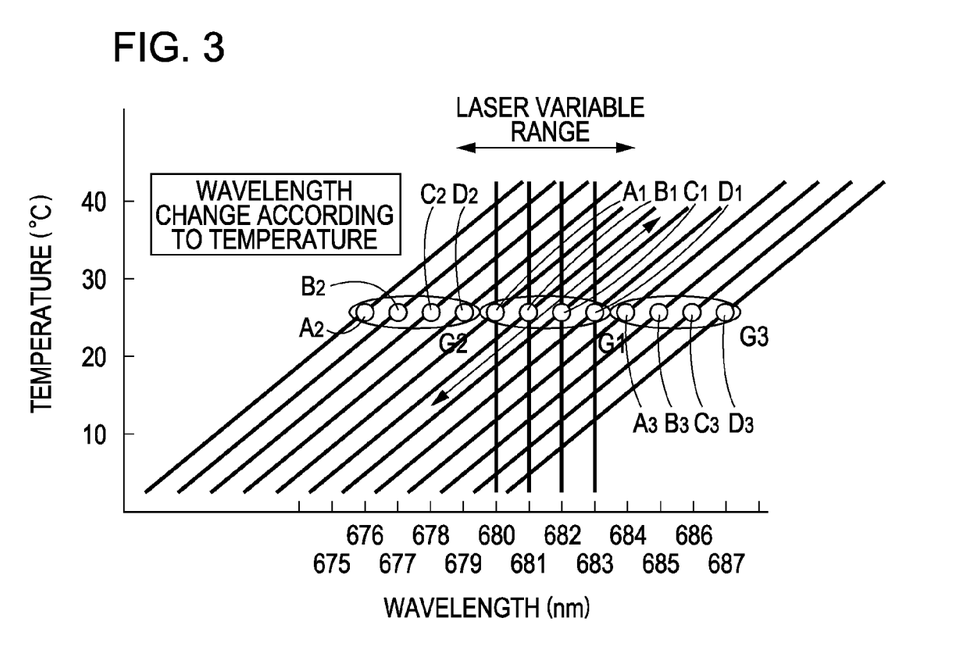
FIG. 3 is a characteristic graph representing the relationship between the temperature and the laser wavelength in the recording medium.

Since the recording medium 3 includes the above materials, the recording medium 3 expands or contracts according to the temperature. Due to the expansion or the contraction, the wavelength of the light source 1 required for reproducing the recorded data is deviated, as shown in FIG. 3. As observed from FIG. 3, if the temperature increases, the recording medium 3 expands to increase the corresponding wavelength, while if the temperature decreases, the recording medium 3 contracts to reduce the corresponding wavelength. Therefore, if the recording medium 3 has expanded or contracted, the recorded data cannot be accurately reproduced unless the reproduction is performed with a different wavelength of the reproduction light from the wavelength of the recording light, i.e., unless the reproduction is performed with a longer wavelength than the wavelength of the recording light when the recording medium 3 has expanded, and unless the reproduction is performed with a shorter wavelength than the wavelength of the recording light when the recording medium 3 has contracted. The relationship between the temperature and the wavelength shown in FIG. 3 is individually determined according to the material forming the recording medium 3.

In the one recording area 31 of the recording medium 3, therefore, a plurality of the same information groups are recorded in substantially the same area with varied multi-parameters, in consideration of the expansion and the contraction of the recording medium 3. That is, in the one recording area 31 of the recording medium 3, a plurality of data groups (information groups) A to D are recorded, with the multi-parameter (a laser wavelength λ in the present example) varied. Specifically, the data groups A to D are recorded in one recording area as three groups: a data group $G_1$ including data $A_1$ (λ=680 nm), data $B_1$ (λ=681 nm), data $C_1$ (λ=682 nm), and data $D_1$ (λ=683 nm); a data group $G_2$ including data $A_2$ (λ=676 nm), data $B_2$ (λ=677 nm), data $C_2$ (λ=678 nm), and data $D_2$ (λ=679 nm); and a data group $G_3$ including data $A_3$ (λ=684 nm), data $B_3$ (λ=685 nm), data $C_3$ (λ=686 nm), and data $D_3$ (λ=687 nm). The interval of the wavelength corresponding to the data elements (1 nm in the present example), the number of data elements included in a group, and the number of groups of the data elements are not limited to the above, and thus can be arbitrarily changed. It is desirable to determine the number of data elements included in a group in accordance with the variable range of the laser wavelength. Further, it is desirable to determine the number of groups of the data elements in accordance with the extent of the expansion or the contraction of the recording medium 3 and within a range in which the expansion or the contraction is allowable.

The second optical system 4 includes a Fourier transform lens 41 for diffusing the reproduction light generated by the irradiation of the recording medium 3 with the light for the information reproduction, and a photodetector 42 for detecting the Fourier-transformed reproduction light and outputting the reproduction signal. The photodetector 42 includes a two-dimensional light-receiving cell array corresponding to the two-dimensional pattern of the reproduction light, which may be formed by a PD array, a CCD device array, a CMOS device array, and so forth, for example.

The wavelength control unit 5 changes the wavelength, which is the multi-parameter, in the multiplex recording of information on the recording medium 3 and the reproduction of information. That is, in the multiplex recording of information and the reproduction of information, the wavelength control unit 5 changes the wavelength of the beam light corresponding to an individual data element and emitted from the light source 1. For example, the wavelength of the light source 1 is set to be $λ_1$ for a data element recorded or reproduced with the wavelength $λ_1$, while the wavelength of the light source 1 is set to be $λ_2$ for a data element recorded or reproduced with the wavelength $λ_2$. The wavelength is changed by changing the current value applied to the light source 1. The wavelength, which is the multi-parameter, is changed through the control of the current value, but may be changed in accordance with the control amount of a value other than the current value.

Description will now be made of an information recording method and an information reproducing method performed by the hologram information recording/reproducing device of the above-described configuration. Description will be made herein of a case in which the light source 1 is laser, and in which the wavelength is controlled as the multi-parameter, i.e., the current value applied to the laser is controlled. The present invention, however, is not limited to the case. Thus, a parameter other than the current value applied to the laser may be controlled, as long as the multi-parameter (the wavelength) is controlled.

Basically, the hologram information recording/reproducing device illustrated in FIG. 1 performs recording by irradiating a recording medium with two coherent lights, which are divided from the light for the information recording, while varying the multi-parameter, and also reproduces information by using the reproduction light diffracted by the light for the information reproduction while varying the multi-parameter.

The hologram information recording will be first described. Description will be made herein of a case in which the recording is performed at an external temperature of 25° C. To record the data $A_1$ with a wavelength of 680 nm, for example, a wavelength control unit 5 sets the current value such that the light source 1 emits beam light having the wavelength of 680 nm. Thereby, the beam light having the wavelength of 680 nm is emitted from the light source 1. The optical path of the beam light is directed to the beam expander 22 by the first mirror 21. Then, the beam light is diffused by the first lens 22a of the beam expander 22, and is converted into parallel light by the second lens 22b. The parallel light is divided by the beam splitter 23 into two mutually coherent lights, one of which is directed to the second mirror 24 and the other one of which is directed to the condenser lens 27.

The light reflected by the second mirror 24 is subjected to data modulation in the spatial light modulator 25. The data-modulated light is condensed on the recording medium 3 as signal light X by the Fourier transform lens 26. Meanwhile, the other light divided by the beam splitter 23 is condensed on the recording medium 3 as reference light Y by the condenser lens 27.

When the signal light X and the reference light Y are combined on the recording medium 3, the signal light X and the reference light Y interfere with each other to form, on the recording medium 3, interference fringes having a periodically changing light intensity. The interference fringes are defined by the shape of the wavefront of the two combined lights. Thus, the shape of the wavefront of the two combined lights is recorded on the recording medium 3 as information. That is, on the recording medium 3, the interference fringes are recorded between the signal light forming a data-modulated wavefront and the reference light forming a wavefront which is not data-modulated. Thereby, the data is recorded on the recording medium 3.

Then, the wavelength control unit 5 sets the current value such that the light source 1 emits beam light having a wavelength of 681 nm, and the data $B_1$ is recorded in substantially the same area of the recording medium 3, as described above. Then, the wavelength control unit 5 sets the current value such that the light source 1 emits beam light having a wavelength of 682 nm, and the data $C_1$ is recorded in substantially the same area of the recording medium 3, as described above. Then, the wavelength control unit 5 sets the current value such that the light source 1 emits beam light having a wavelength of 683 nm, and the data $D_1$ is recorded in substantially the same area of the recording medium 3, as described above. In the above-described manner, the data group $G_1$ is recorded in substantially the same area of the recording medium 3. In the present example, the number of data elements included in a group is set to be four (A to D) corresponding to the variable range of the laser wavelength of one laser. Further, in a similar manner, the data groups $G_2$ and $G_3$ are recorded in substantially the same area of the recording medium 3. As described above, the data is recorded within a range in which the data is reproducible even if the recording medium 3 expands or contracts due to a change in temperature.

Subsequently, as for the hologram information reproduction, to reproduce data with a wavelength of 680 nm, the wavelength control unit 5 sets the current value such that the light source 1 emits beam light having the wavelength of 680 nm. Thereby, the beam light having the wavelength of 680 nm is emitted from the light source 1. The optical path of the beam light is directed to the beam expander 22 by the first mirror 21, and the beam light is diffused by the first lens 22a of the beam expander 22 and converted into parallel light by the second lens 22b. The parallel light passes through the beam splitter 23, and is condensed on the recording medium 3 as the reference light Y by the condenser lens 27. The interference fringes recorded on the recording medium 3 are formed into a Bragg grating. Thus, upon irradiation with the reference light Y, reproduction light Z the same as the signal light X is obtained by Bragg diffraction.

As described above, the recording medium 3 expands or contracts according to the external temperature. Therefore, the reproduction needs to be performed in consideration of the expansion and the contraction. For example, if the external temperature is 30° C., i.e., higher than 25° C. which is the temperature in the recording, the data $A_1$ to $D_1$ ($G_1$) cannot be reproduced with the reproduction light having a wavelength in the range of 680 nm to 683 nm, which is the laser variable range of one laser, as shown in FIG. 3. In the present embodiment, however, the data $A_2$ to $D_2$ ($G_2$) are recorded on the shorter wavelength side of the wavelength range of the data $A_1$ to $D_1$ ($G_1$). Therefore, the data can be reproduced with the use of the data $A_1$ to $D_1$ ($G_1$) and the data $A_2$ to $D_2$ ($G_2$). That is, in the range of the wavelengths 680 nm to 683 nm, which is the laser variable range of one laser, the data $A_1$ to $D_1$ of the data group $G_1$ cannot be read due to the expansion of the recording medium 3 caused by the increase in temperature. However, it is possible to read the data $D_2$ (wavelength of 680 nm) of the data group $G_2$, the data $A_1$ (wavelength of 681 nm) of the data group $G_1$, the data $B_1$ (wavelength of 682 nm) of the data group $G_1$, and the data $C_1$ (wavelength of 683 nm) of the data group $G_1$. The data $D_2$ is the same as the data $D_1$. Consequently, therefore, the data groups A to D can be accurately reproduced irrespective of the external temperature. Accordingly, defective reproduction and the like due to the influence of the external environment and so forth can be reliably prevented.

Similarly, if the external temperature is 10° C., i.e., lower than 25° C. which is the temperature in the recording, the data $A_1$ to $D_1$ ($G_1$) cannot be reproduced with the reproduction light having the wavelength in the range of 680 nm to 683 nm, as shown in FIG. 3. In the present embodiment, however, the data $A_3$ to $D_3$ ($G_3$) are recorded on the longer wavelength side of the wavelength range of the data $A_1$ to $D_1$ ($G_1$). Thus, the data can be reproduced with the use of the data $A_1$ to $D_1$ ($G_1$) and the data $A_3$ to $D_3$ ($G_3$). That is, in the range of the wavelengths 680 nm to 683 nm, which is the laser variable range, the data $A_1$ to $D_1$ of the data group $G_1$ cannot be read due to the contraction of the recording medium 3 caused by the decrease in temperature. However, it is possible to read the data $A_3$ (wavelength of 680 nm) of the data group $G_3$, the data $B_3$ (wavelength of 681 nm) of the data group $G_3$, the data $C_3$ (wavelength of 682 nm) of the data group $G_3$, and the data $D_3$ (wavelength of 683 nm) of the data group $G_3$. The data $A_1$ to $D_1$ are the same as the data $A_3$ to $D_3$. Consequently, therefore, the data groups A to D can be accurately reproduced irrespective of the external temperature. Accordingly, the defective reproduction and the like due to the influence of the external environment and so forth can be reliably prevented.

With a plurality of data groups thus recorded on the recording medium 3, the data multiplexed on the recording medium 3 can be accurately reproduced irrespective of the influence of the external environment and so forth. Further, in the present configuration, a plurality of the same data groups are recorded to cope with the expansion and the contraction of the recording medium 3. Thus, there is no need for a substantial change in the dynamic range of the laser light. Therefore, the reproduction can be performed with one laser. Accordingly, the hologram information reproducing device can be simply and inexpensively configured.

In the above-described information reproducing method, to control the laser wavelength for reproducing a target data element, the wavelength control unit 5 controls the laser wavelength on the basis of, for example, index information (a recorded data address (or a page number), a recorded wavelength, and a recorded temperature) included in the data recorded on the recording medium 3, with the use of the reproduction signal sent from the photodetector 42. For example, it is now assumed in the above-described example that the reproduction of the data $A_1$ recorded with the wavelength of 680 nm is attempted in the information reproduction at the external temperature of 30° C. If laser light having a wavelength of 680 nm is used, the data $A_1$ cannot be reproduced due to the expansion of the recording medium 3. However, the data $D_2$ of the data group $G_2$ can be reproduced. The data $D_2$ includes the index information (e.g., the data address, the recorded wavelength, and the recorded temperature relating to the data $D_2$). In the wavelength control unit 5, therefore, the index information of the data $D_2$ is analyzed to determine whether the data element to be reproduced is on the longer wavelength side or on the shorter wavelength side. In the present example, the data $D_2$ has been reproduced. It is therefore understood that the data $A_1$ to be reproduced is on the longer wavelength side. On the basis of the above information, the wavelength control unit 5 controls to shift the wavelength of the laser light toward the longer wavelength side to reproduce the data $A_1$. In the above-described manner, the target information can be reproduced.

EMBODIMENT 2

Figure 4:
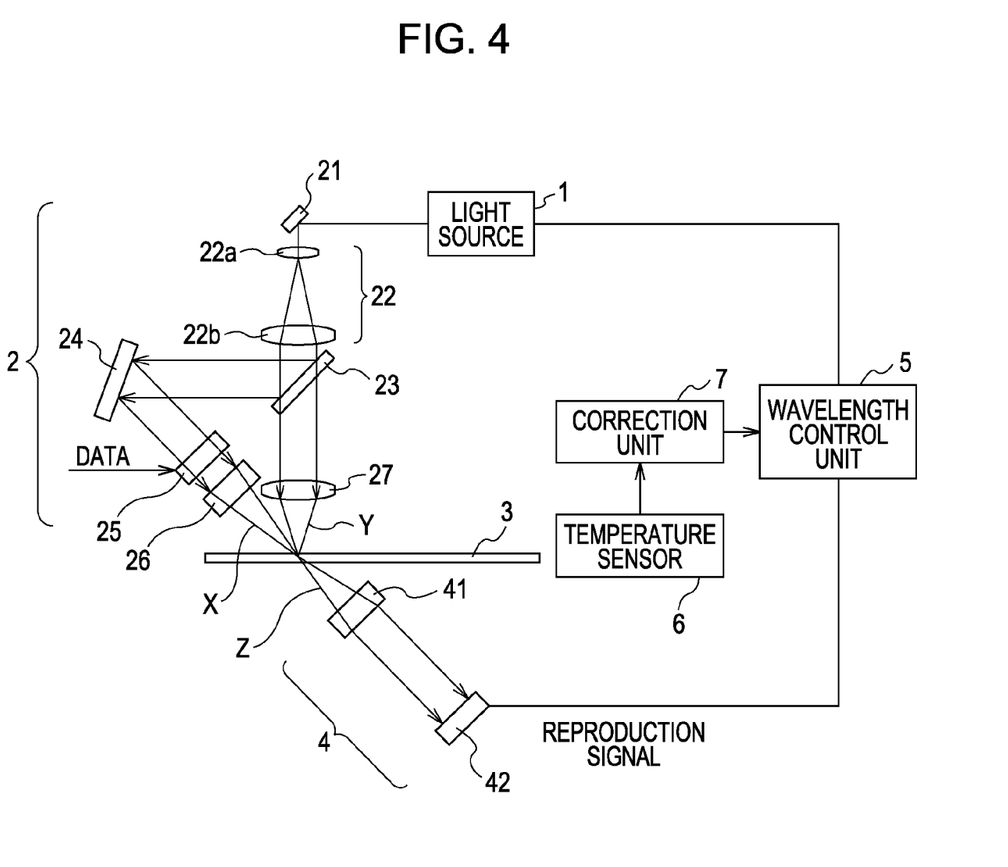
FIG. 4 is a diagram illustrating a schematic configuration of a hologram information recording/reproducing device according to Embodiment 2 of the present invention.

In the present embodiment, description will be made of a case in which the data reproduction is performed by correcting the laser wavelength on the basis of the temperature in the vicinity of the recording medium 3. FIG. 4 is a diagram illustrating a schematic configuration of a hologram information recording/reproducing device according to Embodiment 2 of the present invention. In FIG. 4, the same components as the components of FIG. 1 are assigned with the same reference numerals as the reference numerals of FIG. 1, and detailed description thereof will be omitted.

The hologram information recording/reproducing device illustrated in FIG. 4 includes a temperature sensor 6 for measuring the temperature of the recording medium 3 and/or the vicinity of the recording medium 3, and a correction unit 7 for calculating the amount of correction with respect to the amount of control of the laser wavelength on the basis of the temperature detected by the temperature sensor 6. The correction unit 7 includes a table representing the relationship as shown in FIG. 3 between the temperature and the wavelength in the recording medium 3. In the present hologram information recording/reproducing device, the temperature information detected by the temperature sensor 6 is sent to the correction unit 7. With reference to the above table, the correction unit 7 corrects the relationship between the temperature and the wavelength with the use of the sent temperature information and the index information (the recorded data address, the recorded wavelength, and the recorded temperature) included in the data recorded on the recording medium 3. The corrected content is sent to the wavelength control unit 5. The wavelength control unit 5 controls the laser wavelength (the current value in the present example) on the basis of the corrected relationship between the temperature and the wavelength.

The hologram information recording is similar to the hologram information recording of Embodiment 1. The data groups A to D are recorded in substantially the same area of the recording medium 3 as the data groups $G_1$ to $G_3$. It is now assumed that the reproduction of the data $A_1$ recorded with the wavelength of 680 nm is attempted at the external temperature of 30° C. in the hologram information reproduction. In this case, the temperature in the vicinity of the recording medium 3 is measured by the temperature sensor 6. The temperature information is sent to the correction unit 7. In the correction unit 7, the table of the characteristic shown in FIG. 3 representing the relationship between the temperature and the wavelength has been previously created in the initial state, such as upon power-on or upon start of the information reproduction. For example, FIG. 3 shows that the data $A_1$ of the data group $G_1$ has a wavelength of 677 nm at an external temperature of 15° C., a wavelength of 680 nm at an external temperature of 25° C., and a wavelength of 683 nm at an external temperature of 35° C., that the data $B_1$ of the data group $G_1$ has a wavelength of 678 nm at the external temperature of 15° C., a wavelength of 681 nm at the external temperature of 25° C., and a wavelength of 684 nm at the external temperature of 35° C., and that the data $D_2$ of the data group $G_2$ has a wavelength of 676 nm at the external temperature of 15° C., a wavelength of 679 nm at the external temperature of 25° C., and a wavelength of 682 nm at the external temperature of 35° C. In the initial state, the correction unit 7 creates the table representing such a temperature-wavelength characteristic. In the present example, the description is made of the data $A_1$, $B_1$, and $D_2$ as data of the table. Similarly, the data of the other data groups are formatted into the table.

If the reproduction of the data $A_1$ is attempted at the external temperature of 30° C. with the use of laser light having a wavelength of 680 nm for the information reproduction, the data $A_1$ is not reproduced due to the expansion of the recording medium 3 caused by the increase in temperature. However, the data $D_2$ of the data group $G_2$ is reproduced. In this case, the correction unit 7 updates the table such that the data $A_1$ of the data group $G_1$ has a wavelength of 678 nm at the external temperature of 15° C., a wavelength of 681 nm at the external temperature of 25° C., and a wavelength of 684 nm at the external temperature of 35° C., that the data $B_1$ of the data group $G_1$ has a wavelength of 679 nm at the external temperature of 15° C., a wavelength of 682 nm at the external temperature of 25° C., and a wavelength of 685 nm at the external temperature of 35° C., and that the data $D_2$ of the data group $G_2$ has a wavelength of 677 nm at the external temperature of 15° C., a wavelength of 680 nm at the external temperature of 25° C., and a wavelength of 683 nm at the external temperature of 35° C. If the external temperature is a temperature other than the temperatures included in the table, the external temperature is obtained by calculation through such a method as the interpolation method, on the basis of the relationship between the temperature and the wavelength.

The corrected information obtained by thus updating the table is sent to the wavelength control unit 5. In the wavelength control unit 5, the wavelength of the laser light is controlled on the basis of the corrected temperature-wavelength relationship to reproduce the data $A_1$. Thereby, the target information can be reproduced. In the above-described manner, the temperature in the vicinity of the recording medium 3 is measured to correct the temperature-wavelength relationship. Therefore, the accurate wavelength for the information reproduction can be determined in a short time. As a result, wavelength control in the information reproduction can be promptly performed.

The table is not updated if the reproduction of the target information has succeeded with the wavelength for the information reproduction. Further, in the present embodiment, the description has been made of the case in which the correction unit 7 stores the table representing the temperature-wavelength relationship, and in which the table is updated. In the present invention, however, the correction unit 7 may store the temperatures and the index information (e.g., the data addresses, the recorded wavelengths, and the recorded temperatures) and update the temperatures and the index information.

In Embodiments 1 and 2 described above, the description has been made of the case in which the multiplex recording is performed by wavelength multiplexing when a plurality of the same data groups are recorded in substantially the same area of the recording medium 3. In the present invention, however, the multiplex recording may be performed by angle multiplexing when a plurality of the same data groups are recorded in substantially the same area of the recording medium 3. In such a case, the recording area for one group is used for the same data groups, unlike the case of the wavelength multiplexing. Accordingly, the recording area can be effectively used.

The present invention is not limited to Embodiments 1 and 2 described above, and thus can be modified in various ways. For example, the laser wavelength, the number of data elements, and the number of groups used in Embodiments 1 and 2 described above are not limited thereto, and thus can be arbitrarily changed. Further, the present invention can be arbitrarily modified without departing from the scope of the object of the present invention.

REFERENCE NUMERALS 1 light source
2 first optical system
3 recording medium
4 second optical system
5 wavelength control unit
6 temperature sensor
7 correction unit
21 first mirror
22 beam expander
23 beam splitter
24 second mirror
25 spatial light modulator
26, 41 Fourier transform lens
27 condenser lens
31 recording area
42 photodetector

The invention claimed is:

1. A hologram information recording medium for performing recording thereon by irradiating the recording medium with signal light and reference light while varying a multi-parameter, and for reproducing recorded information therefrom by using reproduction light diffracted by the reference light while varying said multi-parameter,
wherein the multi-parameter to reproduce the recorded information depends on temperature as the hologram information recording medium expands or contracts according to the temperature,
wherein the hologram information recording medium comprises:
a plurality of hologram information groups recorded by a different range of the multi-parameter in substantially the same area, each hologram information group including the same data such that at least one of the plurality of hologram information groups reproduces a target data element if the hologram information recording medium expands or contracts according to the temperature,
and wherein, if the target data element of one of the plurality of hologram information groups is not reproducible due to a change in the temperature, another hologram information group provides a corresponding target data element which is reproducible at the changed temperature.

2. The hologram information recording medium recited in claim 1,
wherein the multi-parameter is the wavelength of the signal light or the reference light, or the angle at which the recording medium is irradiated with the signal light or the reference light.

3. The hologram information recording medium recited in claim 1,
wherein each of the plurality of hologram information groups is recorded with index information which includes temperature condition data of the recording of the hologram information group.

4. The hologram information recording medium recited in claim 1,
wherein the data in each hologram information group includes a plurality of target data elements,
and wherein the multi-parameter for reproducing a given target data element in at least one hologram information group is within a predetermined range corresponding to a variable multi-parameter range of a hologram information reproducing device if the recording medium expands or contracts according the temperature.

5. A hologram information recording device comprising:
a light source for emitting signal light and reference light;
an optical system for irradiating an information recording medium with the signal light and the reference light; and
a multi-parameter control unit for controlling a multi-parameter to perform multiplex recording of information on the information recording medium, the multi-parameter for reproducing the recorded information depending on temperature as the information recording medium expands or contracts according to the temperature,
wherein the hologram information recording device records a plurality of hologram information groups in substantially the same area of the information recording medium using a different range of the multi-parameter, each hologram information group including the same data such that a target data element is reproduced from at least one of the plurality of hologram information groups if the information recording medium expands or contracts according to the temperature,
and wherein, if the target data element of one of the plurality of hologram information groups is not reproducible due to a change in the temperature, another hologram information group provides a corresponding target data element which is reproducible at the changed temperature.

6. The hologram information recording device recited in claim 5,
wherein each of the hologram information groups includes index information which includes temperature condition data of the recording of the hologram information group.

7. The hologram information recording device recited in claim 5, further comprising:
temperature sensor for detecting the temperature in the vicinity of the information recording medium; and
correction unit for performing correction of the multi-parameter for reproducing the information on the basis of the temperature detected by the temperature sensor.

8. The hologram information recording device recited in claim 5,
wherein the multi-parameter is the wavelength of the signal light or the reference light, or the angle at which the recording medium is irradiated with the signal light or the reference light.

9. A hologram information reproducing device comprising:
a light source for emitting reference light;
an optical system for irradiating an information recording medium with the reference light; and
multi-parameter control unit for controlling a multi-parameter to reproduce hologram information multiplex-recorded on the information recording medium, the multi-parameter for reproducing the recorded information depending on temperature as the information recording medium expands or contracts according to the temperature, the information recording medium comprising a plurality of hologram information groups each recorded using a different range of the multi-parameter in substantially the same area, each hologram information group including the same data,
wherein the multi-parameter control unit controls the multi-parameter for the reference light so as to correspond to a range of the multi-parameter for a selected one of the plurality of hologram information groups such that a target data element is reproduced from the selected one of the hologram information groups if the hologram information recording medium expands or contracts according to the temperature,
and wherein if the target data element of one of the plurality of hologram information groups is not reproducible due to a change in the temperature, a corresponding target data in another hologram information group is reproduced at the changed temperature.

10. The hologram information reproducing device recited in claim 9,
wherein the plurality of hologram information groups include index information which includes temperature condition data in each of the recordings of the hologram information groups,
and wherein the multi-parameter control unit controls the multi-parameter for reproducing the information on the basis of the index information.

11. The hologram information reproducing device recited in claim 9, further comprising:

temperature sensor for detecting the temperature in the vicinity of the information recording medium; and correction unit for performing correction of the multi-parameter for reproducing the information on the basis of the temperature detected by the temperature sensor.

12. The hologram information reproducing device recited in claim 9, wherein the multi-parameter is the wavelength of the reference light or the angle at which the recording medium is irradiated with the reference light.

13. The hologram information reproducing device recited in claim 9, wherein the data in each hologram information group includes a plurality of target data elements, and wherein the light source has a variable multi-parameter range for the reflectance light which includes a range of the multi-parameter for reproducing a given target data element in at least one hologram information group.

14. A hologram information recording method comprising:

a step of preparing an information recording medium; and a step of recording a plurality of hologram information groups in substantially the same area of the information recording medium using a different range of multi-parameter of signal light and reference light, the multi-parameter depending on temperature as the information recording medium expands or contracts according to the temperature, wherein each hologram information group corresponds to a different multi-parameter range and includes the same data such that a target element is reproducible from one of the hologram information groups if the recording medium expands or contracts according to the temperature, and wherein, if the target data element of one of the plurality of hologram information groups is not reproducible due to a change in the temperature, another hologram information group provides a corresponding target data element which is reproducible at the changed temperature.

* * * * *